United States Patent [19]

Dumas

[11] Patent Number: 5,712,685
[45] Date of Patent: Jan. 27, 1998

[54] DEVICE TO ENHANCE IMAGING RESOLUTION

[75] Inventor: Jean Dumas, du Parcours, Canada

[73] Assignee: Minister of National Defence of Her Majesty's Canadian Government, Ottawa, Canada

[21] Appl. No.: 515,069

[22] Filed: Aug. 14, 1995

[30] Foreign Application Priority Data

Nov. 14, 1994 [CA] Canada .................................. 2135676

[51] Int. Cl.$^6$ ................................................ H04N 5/225
[52] U.S. Cl. .................................... 348/360; 348/219
[58] Field of Search .................................. 348/241, 250, 348/360, 219, 294, 263; 358/457

[56] References Cited

U.S. PATENT DOCUMENTS

| | | | |
|---|---|---|---|
| 4,204,230 | 5/1980 | Sprague | 348/315 |
| 4,528,596 | 7/1985 | Cope | 348/241 |
| 4,574,312 | 3/1986 | Anderson | 348/294 |
| 4,595,954 | 6/1986 | Endo et al. | 348/219 |
| 4,656,517 | 4/1987 | Shida et al. | 250/208.1 |
| 4,984,890 | 1/1991 | Tojo et al. | 356/356 |
| 5,155,585 | 10/1992 | Ishikawa | 348/360 |
| 5,180,912 | 1/1993 | McEwen et al. | 250/234 |
| 5,241,188 | 8/1993 | Mizutani | 250/548 |
| 5,258,618 | 11/1993 | Noble | 250/332 |
| 5,291,327 | 3/1994 | McEwen . | |
| 5,301,042 | 4/1994 | Blanding . | |
| 5,335,091 | 8/1994 | Palum . | |
| 5,430,481 | 7/1995 | Hynecek | 348/317 |
| 5,444,236 | 8/1995 | Ludington et al. | 250/208.1 |
| 5,561,460 | 10/1996 | Katoh et al. | 348/219 |
| 5,565,914 | 10/1996 | Motta | 348/219 |

OTHER PUBLICATIONS

"Sampling effects in CdHgTe focal plane arrays—practical results", Dann et al, SPIE vol. 685 Infrared Technology XII—(1986), pp. 123 to 127.

Primary Examiner—Andrew Faile
Assistant Examiner—Aung S. Moe
Attorney, Agent, or Firm—Larson & Taylor

[57] ABSTRACT

An imaging device comprising a Focal Plane Array (FPA) image sensor having a grid formed of individual detector elements, arranged in an array of columns and rows, and a mask with a checkerboard pattern of opaque and transparent areas, the mask being located in front of and adjacent to the FPA onto which an image of a scene can be focused by an optical system. The imaging device displaces the mask and FPA with respect to each other in a number of micro-steps that extend in the same direction as that in which a column and a row of the grid extends. The micro-steps in any one direction are of equal lengths which are each a fraction of the length of a detector element. Opaque areas of the mask will then progressively cover equal areas of detector elements in discrete steps for each micro-step movement in one direction at the same time as transparent areas of the mask progressively uncover equal areas of other detector elements for each discrete step. Outputs from the detector elements provide signals for sample slices of the scene for each micro-step and the device reconstructs an image of the scene form those signals. This arrangement allows an enhanced image to be obtained for the scene from the sample slices compared to the image which is obtainable directly from a FPA image sensor or previous types of microscanning arrangements.

18 Claims, 3 Drawing Sheets

DEVICE TO ENHANCE IMAGING RESOLUTION

FIELD OF THE INVENTION

The present invention relates generally to imaging devices and in particular to ones having Focal Plane Arrays (FPAs) image sensors of single-element detectors arranged in a two-dimensional array and wherein a means is provided to enhance the resolution in images of scenes created by the FPA image sensors with microscanning methodology.

BACKGROUND OF THE INVENTION

Recent developments have made it possible to build image sensors formed by Focal Plane Arrays (FPAs) of single-element detectors. These image sensors allow for a staring capability by the simultaneous exposure of all pixels in the sensor during one frame in order to form an image of a scene over a period of time. This is similar in operation to a photographic camera where an image of a scene is built up over the period of time in which a film is exposed to an image of a scene. This type of exposure contrasts with that in standard scanning-type video image sensors since, in a scanning process to develop an image, the integration or exposure time for each pixel in the image sensor is dependent on the scanning rate. The sensitivity, signal-to-noise ratio, resolution, etc., of the FPA image sensors provide dramatic improvements over scanning-type imagers due to the FPAs design and staring capability. Performances in sensitivity and signal-to-noise ratios of many FPA sensors are "background-limited" since noise resulting from the background of an observed scene may be above, or at the same level as, that generated inside the imaging device's detectors. Therefore, even with further improvement in sensitivity, the overall performance of these sensors would not be increased.

The resolution performance of any imaging system is a function of the optics and the image sensor's sampling characteristics. The FPA image sensors are limited by the sampling effect of the grid of individual detector elements because of their staring capability. The resolution limit for FPA sensors obeys the Nyquist theorem which states that a signal must be sampled at more than twice the highest expected spatial frequency in order to be able to recover the original signal. The resolution that can be obtained, as a result, is limited by the actual pitch or spacing between the detector elements in the FPA. Even before this fundamental limit is reached, the precision of high spatial frequency information can fall dramatically. Sampling of spatial frequencies higher that the Nyquist limit will produce aliasing. Aliasing causes high frequency scene detail to be obscured in a reproduced image, that information appearing at lower spatial frequencies, with confusing results that can lead to misinterpretation of objects in an image.

One method of improving the resolution performance of FPA imaging systems is to increase the size and/or focal length of the optics. However, this approach will increase the size, weight and costs of the system. Another method of improving the resolution performance is to reduce the spacing or pitch between the detector elements. However, technological limitations in material processing do not allow the size of detector elements to be reduced beyond a certain point. Furthermore, the wavelength of the Electro-Magnetic Radiation (EMR) focused onto a FPA sensor will also impose a physical limitation on how small the detector elements can be and still be operational. It would be impossible for infrared (IR) radiation to influence the material of the detector elements if, for example, the detector elements are reduced in size to below 3 μm which is comparable in size to the wavelength of IR radiation. The molecular lattice of the IR detector material would then be unable to convert the energy from the IR radiation into an electrical signal.

One method of enhancing the resolution of images produced by FPA image sensors is by using a microscanning techniques. Presently known microscanning techniques use a microscanning arrangement that causes an image of the scene focused onto the sensor to be displaced by some fraction of a pixel with respect to the FPA for each field. A small controlled dithering movement, i.e. microscan, can be applied to either the sensor array or the optical system in order to displace the image of a scene by some fraction of a pixel with respect to the FPA image sensor. A 2×2 microscan, for example, is obtained when field 1 records an image from the sensor at a first reference position of the image, field 2 records the image when it is displaced by half a pixel to the right, field 3 records the image when it is displaced a half a pixel vertically and field 4 is recorded after the image is displaced half a pixel to the left. The image is then returned, vertically, to its original "first reference" position for the next frame. This will cause interpixel sampling to occur in both the horizontal and vertical direction. A 3×3 microscan could be implemented by displacing the image by one third of a pixel for each micro-step. These type of microscan systems have been described by R. J. Dann et al in an article entitled "Sampling effects in CdHgTe focal plane arrays—practical results" that was published on pages 123 to 127 of the SPIE Vol. 685 Infrared Technology XII (1986). U.S. Pat. No. 5,301,042 by Douglas L. Blanding describes similar microscanning techniques and, in particular, a mechanism to provide a reliable dithering motion to a platform on which an image sensor is mounted. Microscanning techniques have the drawback, however, of decreasing the integration time of each detector at a specified image location. This will reduce the overall signal-to-noise ratio and an operator should be permitted trading resolution for overall sensitivity if low energy scenes are to be observed by a microscanned imager.

Microscanning technology allows multiple samples of a scene to be extracted in the same pixel pitch. However, even with a large number of microscan "steps" inside the same detector pitch, the resolution would still be limited to the detector's size or pitch as stipulated by Nyquist's limit. One way to improve the imaging performance with microscanning is to use "super-resolution" techniques and microscanning steps exceeding the Nyquist limit. The sampling methodology begins to resemble a convolution in the sense of conventional signal processing theory if the number of micro-steps is increased and the distance displaced between the steps reduced. When using microscanning steps exceeding the Nyquist limit, "super-resolution" techniques can be used to deconvolve all the samples in order to recover the original signal. This method brings into play complex deconvolution and reconstruction algorithms to "completely" restore the imaging information. However, this "super-resolution" process is computer intensive and prone to instability, especially if temporal and spatial (detector's non-uniformities) noises are present between the different samples. The amount of computing power needed to effectively implement a "super-resolution" process and achieve a video rate or real-time performance exceeds present technologies for any field portable imaging system.

SUMMARY OF THE INVENTION

It is an object of the present invention to improve the resolution obtainable from Focal Plane Array (FPA) image sensors by optimizing microscanning methodology and then reconstructing an image from signals created by an image of a scene focused onto the FPA.

An imaging device, according to one embodiment of the present invention, comprises a Focal Plane Array (FPA) image sensor having a grid formed of individual detector elements, arranged in an array of columns and rows, and a mask with a checkerboard pattern of opaque and transparent areas, the mask being located in front of and adjacent to the FPA onto which an image of a scene can be focused by an optical system wherein means are provided for displacing the mask and FPA with respect to each other in a number of micro-steps that extend in the same direction as that in which a column of the grid extends and means are provided for displacing the mask and the FPA with respect to each other in a number of micro-steps that extend in the same direction as that in which a row of the grid extends, the micro-steps in any one direction being of equal lengths that are smaller than the length of a detector element whereby opaque areas of the mask progressively cover equal areas of detector elements in discrete steps for each micro-step movement in one direction at the same time as transparent areas of the mask progressively uncover equal areas of other detector elements for each discrete step, outputs from the detector elements providing signals for sample slices of the scene for each micro-step with the device having means for reconstructing an image of the scene from said signals.

An imaging device, according to a further embodiment of the invention, has a FPA image sensor and a microscanning arrangement formed by a mask with a checkerboard pattern of opaque and transparent squares in front of the sensor wherein the mask is an optically transparent substrate onto which a deposited material forms the opaque areas.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
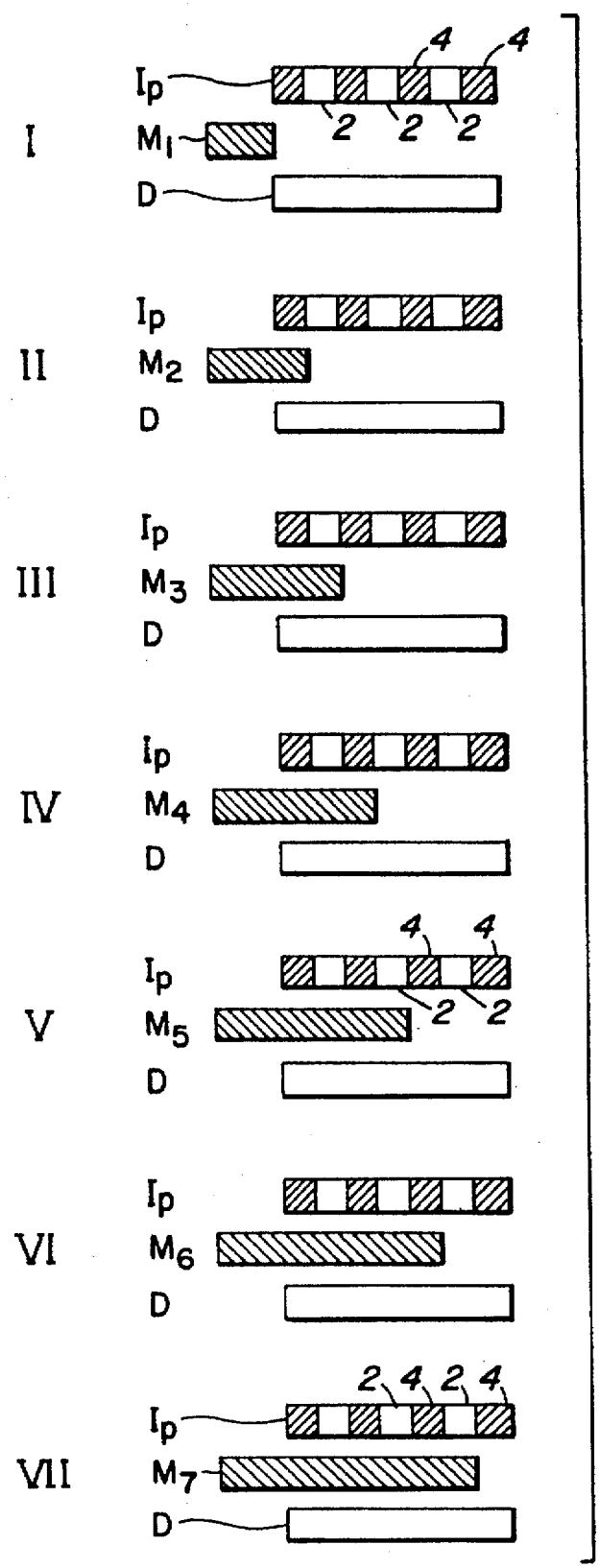
FIG. 1 is a schematic representation of a microscanned detector and a mask pattern moveable in micro-steps in the horizontal direction with the mask and detector positions being shown for each of the micro-steps I to VII.

A number of errors in image detection and reconstruction can occur with a Focal Plane Array (FPA) sensor imaging system provided with a microscanning arrangement. Take, for instance, an image of a checkerboard pattern of light and dark squares focused, by optics, onto a FPA image sensor having detector elements of the same size as that of the individual squares in the checkerboard pattern's image. If, during one frame from the imaging system, the individual squares of the image are aligned with the grid of detector elements in the FPA, the light and dark squares of the checkerboard pattern will be correctly sampled and properly displayed in a reconstructed image. However, a detector element aligned with a light square in which a dark dot is located would detect that particular square as one with an intermediate "gray" shade. Moreover, if the squares in the image of the checkerboard are arranged so that detector elements are located on the border between dark and light squares of the image, then both those light and dark squares will be sensed by the detector elements as having an intermediate "gray" shade. These "in between samples" will result in poor contrast reproduction of an image when any detector element simultaneously samples two different sections of the checkerboard pattern, i.e. a dark square and a light square. An intermediate "gray" shade would then be reproduced in a reconstructed image of both those squares for that instant. A reconstructed pattern from these micro-samples would, as a result, not show sharp edges but rather smooth ones and the loss of high contrast information would be very noticeable for this situation. These errors in image reconstruction can be reduced by reducing the size of the individual detector elements in the FPA so that a number of detector elements would be located in each square of the checkerboard pattern's image. However, technical limitations exist which prevent the detector element's size being reduced beyond a certain point.

Another type of error that can occur when processing microscanned information from a FPA imaging system is that the sampling might not be exact if the micro-steps are small compared to the size of the detector elements in the FPA. It should be noted that each detector element in a FPA does not provide a perfect unidimensional "impulse" sample function but collects energy in two dimensions over the surface of the element. Therefore, every time samples from detector elements simultaneously lose and gain the same amount of energy for each microscanning step, aliased information is measured. The output of a detector element will, as a result, be almost constant over such microscanning steps. Therefore, no modulation will be sampled when an image of a repetitive pattern is microscanned in one direction at the same spatial frequency as that of the repetitive pattern, or a multiple of it. The detector's energy, in this case, which is gained or lost at one end of a detector element for each micro-step will be lost or gained at the other end of that detector element. Therefore, the output signal from that detector element will not change. The reconstruction of an image is even more difficult if diagonal spatial frequencies are present relative to the direction of the microscanned movements. The energy variations, in this case, are in two dimensions which makes it difficult to exactly reconstruct images of the scene. All of these situations can occur for an infrared (IR) image sensor when parallel streets or open fields are observed by the sensor from a high altitude aircraft.

The above limitations in imaging systems can be counteracted or reduced, according to the present invention, by masking parts of the observed scene from the detector elements with a "shutter". Microscanning with a simple shield over the detector to mask parts of it can enable a more appropriate sampling than could be obtained with previous microscanning arrangements. This principal is illustrated in FIG. 1 with a "shutter" mask M between the projected image plane $I_p$ and a detector D for a number of different positions of the mask, i.e. for each of the micro-steps I to VII. The mask M for each of the micro-steps I to VII is identified by a subscript 1 to 7, respectively.

The mask M progressively blocks more of the space between the image plane $I_p$ and detector D for each of the micro-steps I to VII, as shown in FIG. 1, and this is illustrated by the masks $M_1$ to $M_7$ having different lengths for each of the corresponding micro-steps I to VII. The output from the detector D is shown in the graph of FIG. 2 for each of the micro-steps I to VII.

The image shown in the image plane $I_p$ for the detector consists of a number of light bars 2 and a number of dark (shaded) bars 4 forming an image pattern of alternating light and dark bands with each bar having a width equal to the length of one micro-step movement of the mask M. That particular width for the bars has been selected for ease of understanding the principles of the present invention. For micro-step I, the mask $M_1$ is not located between the image plane $I_p$ and detector D but entirely to the left of them as shown. This will provide a maximum output signal from detector D as illustrated in the graph of FIG. 2. The mask is next moved, for micro-step II, to a position $M_2$ where it blocks the space between the furthest left dark bar 4 of the image from detector D. This position of the mask will cause the output of detector D to drop by a small amount as shown in FIG. 2. The next micro-step (III) movement of the mask to $M_3$ will block, not only the left-hand dark bar 4 of the image from detector D, but also the adjacent light bar 2 of the image as well. This will cause, for the micro-step III, the output of detector D to drop a further amount, a larger amount than at micro-step II since a light band of the image is now blocked from the detector by the mask $M_3$. Each time a micro-step movement of the mask blocks an additional dark bar from the detector D, its output will drop a small amount and each time a micro-step movement of the mask blocks an additional light bar from the detector D, its output will drop by a larger amount as shown in FIG. 2.

Figure 2:
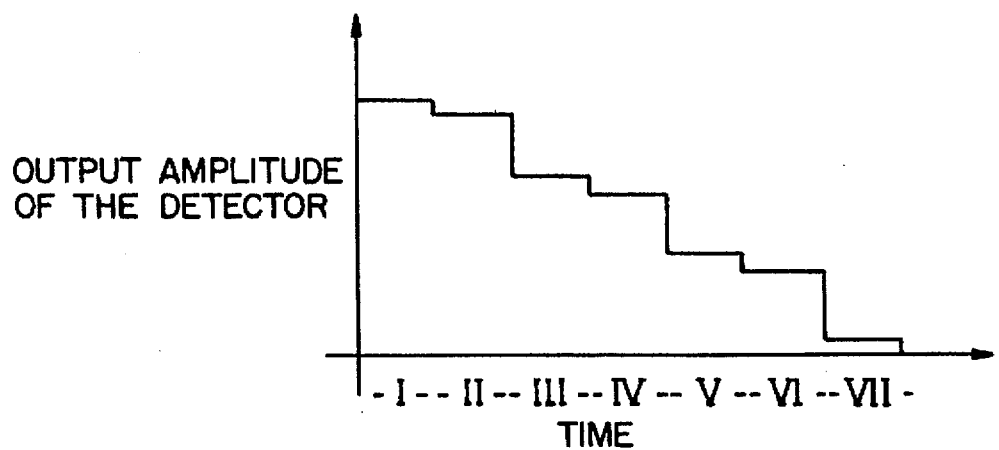
FIG. 2 is a graph showing the output of the detector in FIG. 1 for each of the micro-steps I to VII.

FIG. 2 clearly illustrates that the energy level of the output from detector D decreases in discrete steps as the different parts of the bar pattern in the projected image plane $I_p$ are masked, by mask M, from detector D when the mask M is moved by discrete micro-steps through the steps I to VII. The difference between the various levels for the output signal of detector D is representative of the energy contained in the "slice" that was just masked. The exact energy level in that "detector slice" can be recovered by subtracting the sampled level of energy concurrently along with the microscan. Spatial modulation in the direction of the microscan can be reconstructed entirely since no artifacts or aliased signal can be present due to the presence of the mask.

Figure 3:
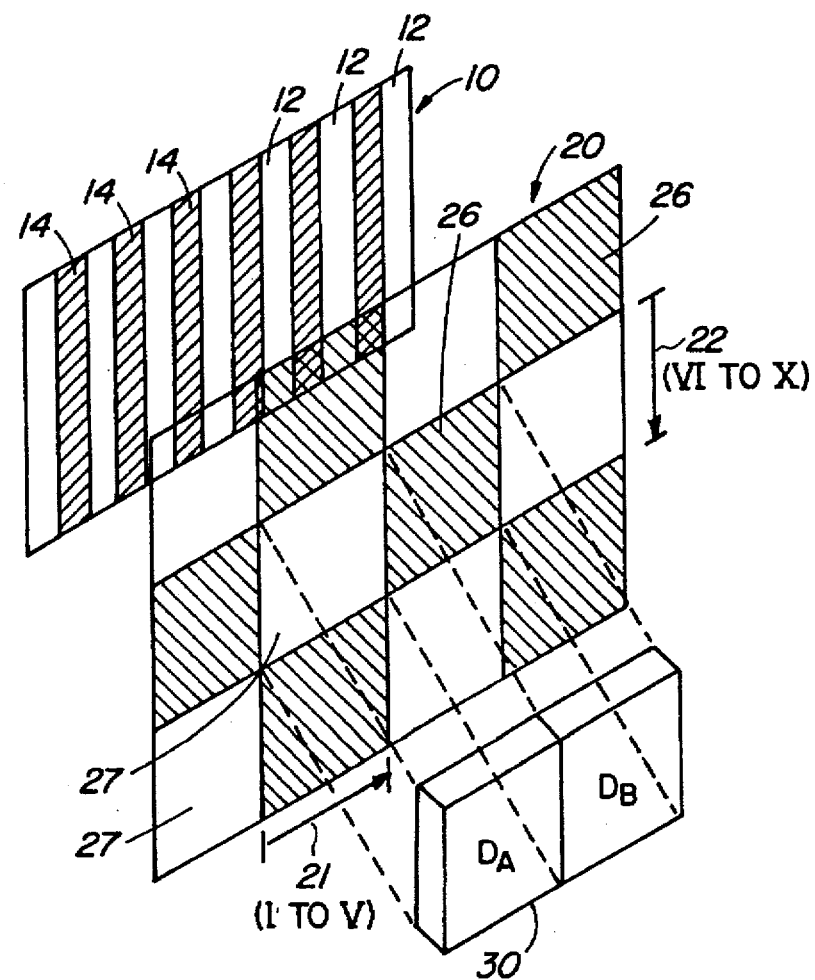
FIG. 3 is a schematic representation of a microscan arrangement, according to the present invention, with a checkerboard mask pattern moveable in micro-steps, both horizontally (micro-steps I to V) and vertically (micro-steps VI to X), in front of two adjacent detector elements of an image sensor.

FIG. 1 illustrates an arrangement with a mask M that is moved in micro-steps, i.e. microscanning, in only the horizontal direction. However, that concept can be extended to microscanning in two dimensions by moving the "mask" in micro-steps over the FPA in the horizontal direction and then, following that, moving it in micro-steps in the vertical direction. A mask in a checkerboard configuration of transparent and opaque squares positioned over an FPA, when moved horizontally and vertically in micro-steps, makes it possible to extract "slices" of imaging information horizontally and vertically and to sample slices over every detector element simultaneously. This type of arrangement is illustrated in FIG. 3 wherein a simple vertical bar pattern of alternating dark 14 and light 12 strips or bars is focused on the image plane 10 and a checkerboard mask 20 of alternating opaque 26 and transparent 27 squares is located between the image plane 10 as shown in the Figure and a FPA 30, only two adjacent detector elements $D_A$ an $D_B$ being shown in FIG. 3. In actual practice, the image plane 12 will correspond with the surface of the detector array 30 with the mask 20 being directly in front of the array 30.

A checkerboard pattern 20 of alternating opaque 26 and transparent 27 squares having the same dimensions as individual detector elements $D_A$ and $D_B$ is shown, for simplicity, in FIG. 3 with the central squares of the checkerboard pattern being located directly in front of and aligned with the detector elements $D_A$ and $D_B$ for a first reference position of mask 20 as illustrated. When the mask 20 is located at that first position, a transparent square 27 of the mask is located directly over detector element $D_A$ and an opaque square 26 is located directly over detector element $D_B$, as indicated by the dotted lines, with those squares 26 and 27 being the same size as the detector elements. A smaller fill factor than what is shown could, however, be used in this configuration.

Arrows 21 and 22 in FIG. 3 illustrate how the microscanning mask 20 is moved, in micro-steps, in a square pattern to gather "slice" information from all the detectors. The mask pattern 20 is first moved in the direction of arrow 21 horizontally, to the right in a number of micro-steps I to V, for a total distance equal to the width of one detector element. During movement of mask 20 in the direction of arrow 21, the detector $D_B$ will be more exposed to the image whereas detector element $D_A$ will be further masked for each of these micro-steps due to the motion of the transparent square in front of $D_A$ and its, left side, adjacent opaque square. Only two detector elements are illustrated in FIG. 3. However, the above procedure will apply to all elements in the FPA image sensor grid so that as the checkerboard pattern 20 moves in the direction of arrow 21, half of the detector elements will be more exposed to radiation while the other, adjacent, detector elements will be further masked for each micro-step. The level of radiation in a particular horizontal slice, i.e. for each micro-step, can then be obtained by subtracting the samples from each other as previously described with respect to FIG. 2. Since, in the particular case illustrated in FIG. 3, the checkerboard squares of mask 20 are the same size as the detector elements; when the mask is moved horizontally far enough from its initial position to completely block or expose another detector element, it will then be moved vertically downward in the direction of arrow 22 with a number of microscanning steps VI to X. Vertical slices of information are then sampled with the same type of subtraction process as used for the horizontal slices. Upon completion of this process, i.e. when the vertical movement in direction of arrow 22 of the checkerboard pattern completely blocks or exposes a detector again, a set of vertical and horizontal sampling in the same detector pitch will be available. A further microscanning movement of the mask to the left and another vertically upward will bring the mask 20 back to its original, first reference, position. A "circular", i.e. square-shaped, pattern is followed in order to minimize optical dead time. The micro-steps motion of the mask should be in the same direction as either that in which a column or row of detector elements extends so that equal areas of each detector is either more exposed or blocked for each micro-step.

The number of micro-steps, for each direction, which is required to improve the resolution of any one particular device to what is desired will be determined by the sensitivity and signal-to-noise ratio of the detector's elements. The difference of sampled radiation will be infinitesimal and lost in noise, for instance, if the number of micro-steps is too large since increasing the number of micro-steps decreases the integration time of each detector element at any one specified image location. Therefore, the number of micro-steps taken in any one direction will have to be adjusted to obtain an optimal response from a particular FPA image sensor.

Figure 4A:
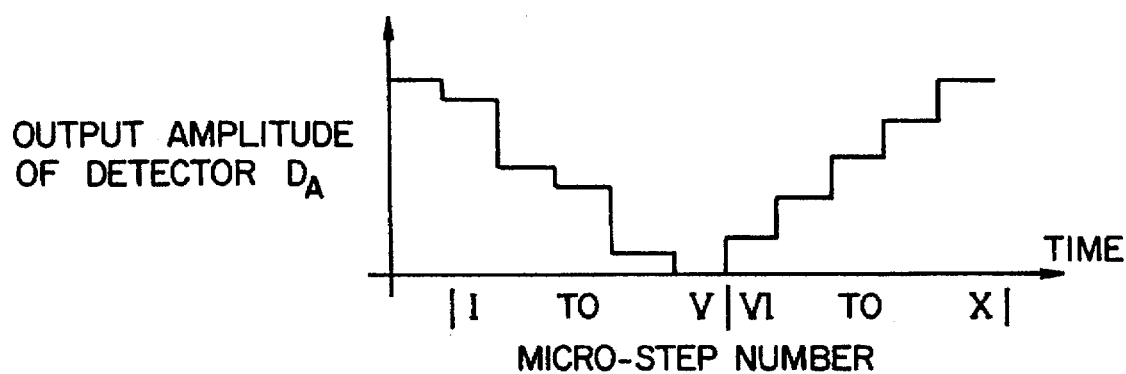
FIG. 4A is a graph of the output of one detector $D_A$ in FIG. 3 for each of the micro-steps I to V in the horizontal direction and each of the micro-steps VI to X in the vertical direction.
Figure 4B:
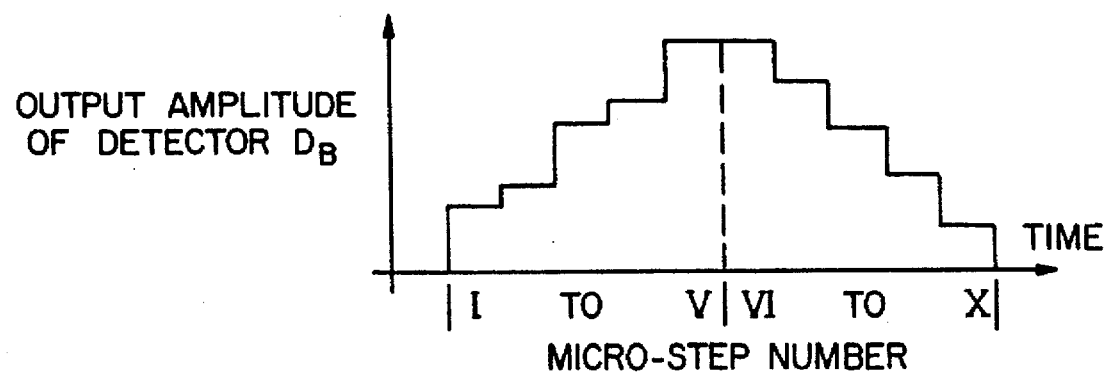
FIG. 4B is a graph of the output of the other, adjacent, detector $D_B$ in FIG. 3 for each of the micro-steps I to V in the horizontal direction and each of the micro-steps VI to X in the vertical direction.

A microscanning process with a checkerboard mask as shown in FIG. 3 can be more clearly described by referring to the graphs in FIG. 4A and FIG. 4B. These Figures, together with FIG. 3, illustrate a basic example of 5 "slices" microscanning in each direction according to the present invention, i.e. 5 micro-step movements of the mask 20 horizontally in the direction of arrow 21 followed by 5 micro-steps vertically in the direction of arrow 22.

In FIG. 3, the detector $D_A$ is entirely aligned with and behind a transparent area 27 of mask 20 at an initial point in time as shown and detector $D_B$ is entirely aligned with and behind an opaque area 26 as indicated by the dotted lines. Therefore, at this initial point in time, detector $D_A$ will be fully exposed to the image plane 10 while detector $D_B$ will be fully masked and receive no radiation from the image of a scene at that image plane. This will provide a maximum output from detector $D_A$ as shown in the FIG. 4A graph and a minimum (zero) output from detector $D_B$ as shown in FIG. 4B. This, so-called, "zero" output will not actually be completely at a zero level due to background noise which will generate a small signal from the detector elements. For the first micro-step I, the mask 20 is moved a short distance, i.e. 1/5 of the width of a detector element, to the right in the direction of arrow 21. This movement will cause the transparent square 27 in front of detector $D_A$ to move to the right and an adjacent opaque square 26 at that transparent square's left-hand edge to cover, i.e. mask, a small first left-hand area of detector $D_A$. This will result in the output of detector $D_A$ dropping a certain amount as shown in FIG. 4A. The graph in FIG. 4A indicates that the output signal of $D_A$ only drops a small amount for this first micro-step which would be due to the mask 20 covering an area on $D_A$ onto which a dark bar 14 of the image is directed. At the same time, the first micro-step results in the right-hand edge of the transparent square 27 in front of $D_A$ moving in front of a first left-hand strip of detector $D_B$, exposing it to the image, causing its output to increase as shown in the graph of FIG. 4B. The increase in the signal from $D_B$ is larger than the drop in signal from $D_A$ which indicates that this first left-hand strip of detector $D_B$ is one on which a light strip 12 of the image 10 is located and to which $D_B$ is exposed after the first micro-step.

A second micro-step movement of the mask (step II) to the right will cause the mask to further shield detector $D_A$ from the input image, dropping the output signal from $D_A$ even farther as shown in FIG. 4A. For this second micro-step, the output $D_A$ drops a larger amount than for the first step which indicates that this second step caused an area on detector $D_A$ to be covered by the mask onto which a light strip 12 of the image 10 was located. This second micro-step will, at the same time, further expose detector $D_B$ which increases its output as illustrated in FIG. 4B. The increase shown in FIG. 4B for step II is smaller than that for step I which indicates that the further exposure of $D_B$ is along a strip of $D_B$ onto which a dark bar 14 of the image is focused. A similar process takes place for each of the micro-steps II to V, with the output of detector $D_A$ dropping to a minimum (zero) after step V since $D_A$ will then be fully covered by an opaque area of the mask, each micro-step displacing the mask by 1/5 the width of a detector element. Detector $D_B$ will, as the same time, be fully exposed to a transparent area 27 of the mask 20 and its output will reach a maximum as indicated in FIG. 4B.

The amplitude level of the signal from the detectors will increase or decrease a certain amount for each micro-step with the real level of radiation output for each sampled slice being the difference in amplitude level from the previous micro-step and its level after the micro-step. This results in the level of the signal from each detector shifting in a staircase pattern between its maximum and minimum levels with the height of the steps in the staircase pattern being dependent on the image in the image plane 10. In the case shown in FIG. 3 with an image of vertical light and dark bars, 12 and 14 respectively, a micro-step which exposes more of a light area 12 to a detector will result in a large change upward in that detector's output, i.e. a large step in the staircase pattern. Similarly, a micro-step which cases the mask to shield more of a light area 12 of the mask will result in a large drop in that detector's output, i.e. a large step in the staircase pattern. However, if the micro-step exposes (or shields) more of a dark bar 14 to (from) the detector, that detector's output level will change by a smaller amount, i.e. a smaller step in the staircase pattern of the detector's output signal level.

Once the checkerboard mask is moved the 5 steps horizontally, providing a 5 slice horizontal micro-step output, the mask is moved downward vertically in the direction of arrow 22 in a series of 5 micro-steps. In a similar manner, to the horizontal movement, each vertical micro-step will cause the checkerboard pattern to mask or expose more of each detector element to the image. The amplitude output level from each detector will change by an equal amount for each vertical micro-step in this case since the image consists only of vertical bars, i.e. light bars 12 and dark bars 14. The signal output for the detectors will again change in amplitude in a staircase-like pattern but the change in amplitude level for each micro-step will be equal. This is illustrated in FIGS. 4A an 4B with the regular staircase pattern of equal steps for the micro-steps VI to X. Once the 5 micro-steps in the vertical direction are completed, the checkerboard mask 20 is moved horizontally, by 5 micro-steps again, in a direction opposite to arrow 21. Afterwards, the checkerboard mask 20 is moved 5 micro-steps vertically upward which will place the mask 20 back to its original reference position. The microscanning steps are then repeated with 5 microscanning slices being obtained for each horizontal and vertical movement of the mask 20.

The microscanning mask 20 should have good mechanical rigidity and stability such as can be obtained with the use of an optical substrate of a material that provides good optical transmission and minimal distortion. The opaque areas (squares 26) of the mask can then be laid out on that optical substrate by, for instance, deposition of an absorbing material on the substrate in the required checkerboard pattern. Current silicon technology enables precise and uniform depositions of absorbing material on a substrate at relatively low cost. Micro-step movements of the mask can then be performed by piezoelectric elements connected to edges of the substrate.

The absorbing material forming the opaque squares on the mask should be one that does not create any energy reflection within the optical system. This assumes that the deposited layer of the mask does not emit or reflect any significant electromagnetic radiation which is generally true in the ultraviolet to visible-light spectral/band for standard absorption materials. However, the coating layer behaves much like a "black body" and may emit a certain level of energy in the infrared (IR) band. That emission can be due to re-emission created by absorption of input energy. In order to implement this microscanning technology with IR FPAs, a high energy diffusion material should be selected for the checkerboard pattern coating on the substrate which will absorb and then diffuse radiation uniformly over its entire surface. This type of coating should then provide a constant transmitted radiation background value which would result in a constant background signal being generated by the associated FPA. Detectors of the FPA directly underneath the coating would then sample a uniform energy level and that uniform level of re-emission can be measured when the whole mask is over the detector during microscanning. By dividing the level measured by the number of micro-steps of displacement, the average level of re-emission per "slice" is easily calculated. Simple algebra can then be used to add or subtract this constant level to recover the real scene energy level in a particular slice.

It has been found that a simple distribution method is generally satisfactory to efficiently reconstruct an image from all the different samples of the microscanning "slices". A "modulation ratio" algorithm can be used which consists of distributing the energy in one slice in the same way as the modulation ratio perpendicular to that slice. In this algorithm, the sampled slices in one direction are first all individually divided by the total amount of energy in the detector area which gives modulation ratio values between 0 and 1. That Total Energy value in the detector area can be obtained by sampling the energy value when the detector is fully exposed. The results of the first computation are each multiplied by the perpendicular slice sample corresponding to that particular row with single pixels being reconstructed in that manner. The modulation ratio can be calculated as either of the two corresponding perpendicular "Slices" over the "Total Energy" value. The other perpendicular slice value is assimilated into the energy level to be distributed proportionally by the calculated modulation ratio. One advantage of this process is that it is invariant in both microscanning directions. One multiplication and one division suffice to recover a pixel with this method. This numerical method is stable and applicable to real-time operations wherein the mathematical process can be implemented with hardware that uses simple arithmetic function blocks.

The sampling-reconstruction methodology described above is really a compromise between simplicity, efficiency and speed of computing which are generally required for field operation. Therefore, this methodology is not always perfect and in some extreme situations, artifacts can be created in the image when, for instance, diagonal edges exist in the scene relative to the sampling grid or when right-angle corners are present. However, realizing these limitations, additional computations can be implemented in order to eliminate or reduce these unwanted artifacts as much as possible.

Many schemes have been proposed to solve problems with artifacts created by diagonal edges. A simple solution is possible for diagonal edges since two simple gradient filters can be used to find the amplitude and direction of a diagonal edge inside a reconstructed grid and in the other detectors surrounding it. A series of comparisons are first performed to determine if a local "diagonal" gradient is present in the slice. Successive subtractions are then performed between the different slices in each direction of the microscanning. If all the slice values increase in the same diagonal direction, another global diagonal gradient computation is performed. A 3 by 3 Haddaman gradient kernel is then chosen to locate a global edge direction around a central detector point. This 3 by 3 Haddaman gradient kernel is described by Besancon, J. E. in "Vision par Ordinateur en deux et trois dimensions", Edition Eyrolles, Paris, $1^{iere}$ Edition, 1988. The global direction is determined from the total energy sampled by all the detectors around the detector of interest. Each gradient kernel is then computed and the maximum one determines the direction of the global edge. If the gradient kernel value exceeds the (image specific) edge threshold value, the pixel and its surrounding area undergo further processing to remove artifacts. The gradient kernel threshold value is usually defined using the average pixel value for the images. If the two diagonal gradient filters are simultaneously positive, an individual median filter is applied to all the "already reconstructed" pixels that surround the reconstructed pixel along with the original pixel value. A 3 by 3 median filter kernel is applied. This simple scheme has proved to be sufficient to remove any overshoots caused by a diagonal edge in the reconstructed pattern. A total of about 200 mathematical operations are required to perform the detection of a diagonal edge and its overshoot correction for a five-step microscan in each direction. However, only 12 operations are required to determine if a local edge is present. Simple logic blocks can efficiently perform local gradient detection and the rest of the computation can then be performed if that detection is positive. A customized signal processing chip can easily handle the global edge detection and median filtering for real-time application.

Various modifications may be made to the preferred embodiment described without departing from the spirit and scope of the invention as defined in the appended claims. The embodiment described has, for simplicity of description, mainly been directed to a device with a checkerboard mask having squares the same size as the detector elements. However, other sizes can just as easily be used to implement the present invention.

The embodiments of the invention in which an exclusive property or privilege is claimed are defined as follows:

1. An imaging device comprising a Focal Plane Array (FPA) image sensor having a grid formed of individual detector elements, arranged in an array of columns and rows, and a mask with a checkerboard pattern of opaque and transparent areas, the mask being located in front of and adjacent to the FPA onto which an image of a scene can be focused by an optical system wherein means are provided for displacing the mask and FPA with respect to each other in a number of micro-steps that extend in the same direction as that in which a column of the grid extends and means are provided for displacing the mask and the FPA with respect to each other in a number of micro-steps that extend in the same direction as that in which a row of the grid extends, the micro-steps in any one direction being of equal lengths that are smaller than the length of a detector element whereby opaque areas of the mask progressively cover equal areas of detector elements in discrete steps for each micro-step movement in one direction at the same time as transparent areas of the mask progressively uncover equal areas of other detector elements for each discrete step, outputs from the detector elements providing signals for sample slices of the scene for each micro-step with the device having means for reconstructing an image of the scene from said signals.

2. An imaging device as defined in claim 1, wherein the mask is an optically transparent substrate onto which a deposited material forms the opaque areas.

3. An imaging device as defined in claim 2, wherein the opaque and transparent areas of the mask are squares having the same size as the individual detector elements and the mask covers the entire surface of the FPA.

4. An imaging device as defined in claim 3, wherein the length of a detector element in any one direction is a multiple of the length of a micro-step in that direction.

5. An imaging device as defined in claim 4, wherein the means provided for displacing the mask and FPA with respect to each other are piezoelectric elements connected to edges of the substrate.

6. An imaging device as defined in claim 5, wherein the means provided for displacing the mask and FPA with respect to each other have means to displace the mask in a number of micro-steps in a first direction, a means to displace the mask an equal number of micro-steps in a second direction perpendicular to the first direction, a means to displace the mask an equal number of micro-steps in a direction opposite to the first direction and a means to displace the mask an equal number of micro-steps in a direction opposite to the second direction, each micro-step displacement being of equal lengths.

7. An imaging device as defined in claim 1, wherein the opaque and transparent areas of the mask are squares having the same size as the individual detector elements and the mask covers the entire surface of the FPA.

8. An imaging device as defined in claim 7, wherein the length of a detector element in any one direction is a multiple of the length of a micro-step in that direction.

9. An imaging device as defined in claim 8, wherein the mask is an optically transparent substrate onto which a deposited material forms the opaque areas.

10. An imaging device as defined in claim 9, wherein the means provided for displacing the mask and FPA with respect to each other have means to displace the mask in a number of micro-steps in a first direction, a means to displace the mask an equal number of micro-steps in a second direction perpendicular to the first direction, a means to displace the mask an equal number of micro-steps in a direction opposite to the first direction and a means to displace the mask an equal number of micro-steps in a direction opposite to the second direction, each micro-step displacement being of equal lengths.

11. An imaging device as defined in claim 10, wherein the number of micro-steps the mask is moved in any one direction has a total length equal to the length of a detector element in that direction.

12. An imaging device as defined in claim 1, wherein the means provided for displacing the mask and FPA with respect to each other have means to displace the mask in a number of micro-steps in a first direction, a means to displace the mask an equal number of micro-steps in a second direction perpendicular to the first direction, a means to displace the mask an equal number of micro-steps in a direction opposite to the first direction and a means to displace the mask an equal number of micro-steps in a direction opposite to the second direction, each micro-step displacement being of equal lengths.

13. An imaging device as defined in claim 12, wherein the length of a detector element in any one direction is a multiple of the length of a micro-step in that direction.

14. An imaging device as defined in claim 13, wherein the mask is an optically transparent substrate onto which a deposited material forms the opaque areas.

15. An imaging device as defined in claim 2, wherein the deposited material is a high energy diffusion material that readily absorbs and diffuses electromagnetic radiation.

16. An imaging device as defined in claim 9, wherein the deposited material is a high energy diffusion material that readily absorbs and diffuses electromagnetic radiation.

17. An imaging device as defined in claim 14, wherein the deposited material is a high energy diffusion material that readily absorbs and diffuses electromagnetic radiation.

18. An imaging device as defined in claim 14, wherein the number of micro-steps the mask is moved in any one direction has a total length equal to the length of a detector element in that direction.

* * * * *